3,325,736
DOPPLER CANCELATION SYSTEM

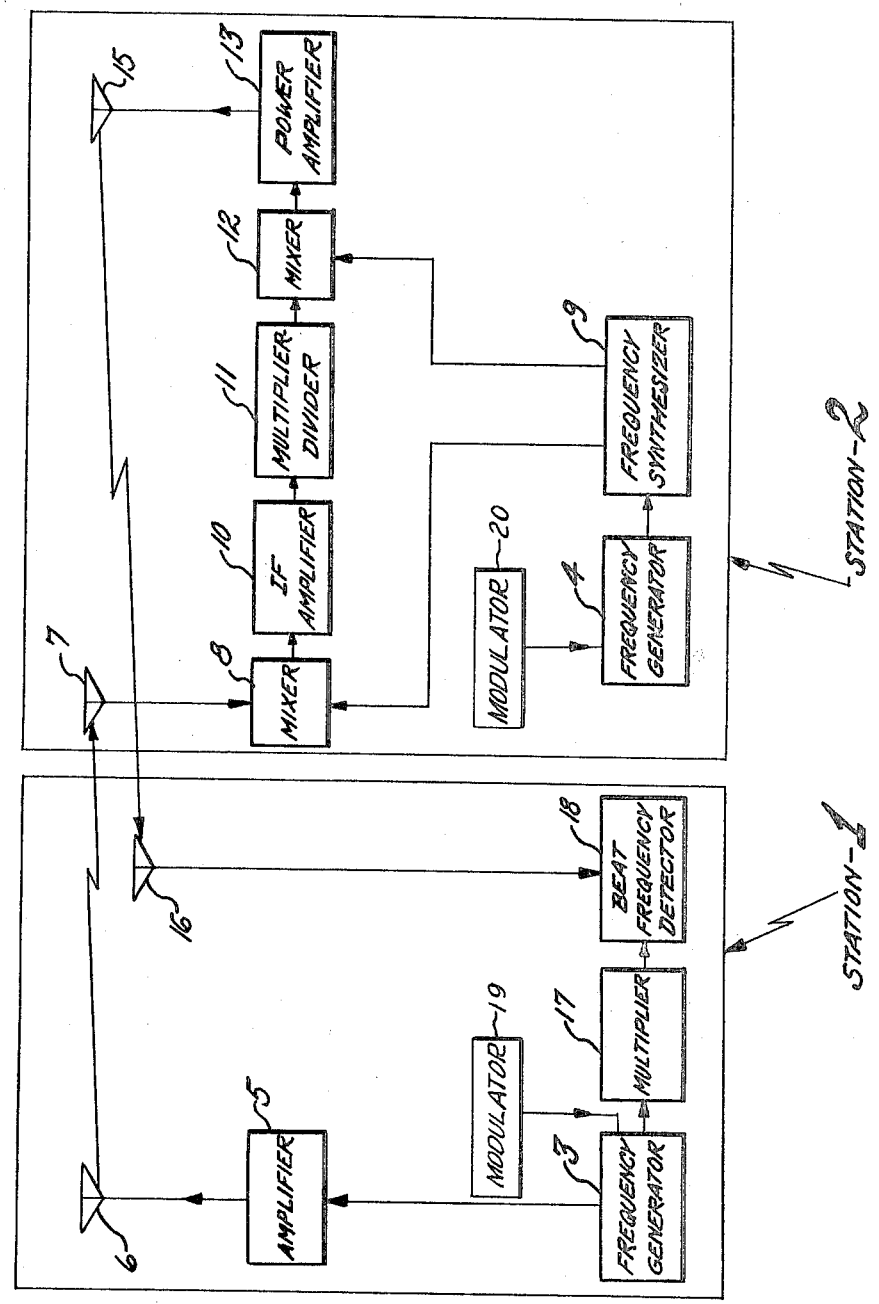

Richard M. Waetjen, Quito, Ecuador, assignor to the United States of America as represented by the Secretary of the Air Force
Filed May 19, 1964, Ser. No. 368,720
3 Claims. (Cl. 325—65)

The invention described herein may be manufactured and used by or for the U.S. Government for governmental purposes without payment to me of any royalty thereon.

This invention relates to a system for the cancellation of Doppler frequency shift due to the motion of one body with respect to another and more particularly this invention relates to a Doppler cancellation system incorporating identical frequency generators in each body.

A Doppler cancellation scheme is presented in this invention which has potentialities in the fields of communication, data transmission, and navigation systems for vehicles moving at high velocities.

A novel feature of this invention is that received and transmitted frequencies at each of the stations involved are different, thus preventing feedback from the transmitting antenna to the receiving antenna at the stations, which weakness is characteristic of conventional Doppler cancellation schemes.

The system shown here is capable of continuous operation. Time-sharing schemes and delay lines are not required as would be the case with conventional Doppler cancellation circuits.

Amplification is provided at a frequency which can be chosen to have a convenient value. This factor is important in the case of microwave systems, since high-gain microwave amplifiers are not as reliable as IF amplifiers operating at frequencies of 1 to 200 mc.

An object of this invention is to provide a system of communication between two moving bodies that effectively eliminates the Doppler shift.

Another object is to provide a system of communication between two moving bodies that effectively eliminates the Dopper shift without the need for time-sharing schemes or delay lines.

Other objects and features of this invention will become more apparent by reference to the following description when taken in conjunction with the accompanying drawing which is a schematic diagram in block form showing an embodiment of the invention.

The described circuit is capable of cancelling first-order Doppler frequency shifts which occur with communication, data transmission, and radio navigation systems involving vehicles moving at high velocities. The circuit allows continuous-wave, real-time operation in contrast to conventional Doppler cancelling apparatus whose output is at the same frequency at the input and requires the use of pulsed operation and a delay line to prevent feedback from transmitting antenna to receiving antenna of the apparatus.

First-order Doppler frequency shifts can be cancelled with the circuit shown in the drawing. Station 1 and station 2 move with respect to each other and contain frequency generator 3 and frequency generator 4, respectively, each producing a signal having the same frequency, $f$. Frequency generators 3 and 4 can be modulated with a signal or data to be transmitted by modulators 19 and 20. Frequency $f$ is amplified by amplifier 5 and transmitted from antenna 6. The frequency received at antenna 7 of station 2 is equal to $$f\left(1+\frac{v}{c}\right)$$

due to the Doppler shift, if station 2 is approaching station 1 at the velocity $v$ and $c$ is the velocity of light. This frequency is fed to mixer 8. The output of frequency generator 4, frequency $f$, is fed to frequency synthesizer 9 which multiplies frequency $f$ by factor $a$. The new frequency $af$ is also fed to mixer 8. The factor $a$ is greater than one and must be close to one if a low intermediate frequency is desired. The output of mixer 8 is amplified in IF amplifier 10 and then fed to the frequency multiplier-divider network 11. IF amplifier 10 is tuned to the difference frequency output of mixer 8 which is $$af - f\left(1+\frac{v}{c}\right)$$

which is equal to $$f\left(a-1-\frac{v}{c}\right)$$

This signal is multiplied by factory $n$ in multiplier-divider networks 11 thereby having the output of $$nf\left(a-1-\frac{v}{c}\right)$$

which is fed to second mixer 12. A frequency $nf(2-a)$, generated by synthesizer 9 from an input consisting of frequency $f$ is also fed to second mixer 12 whose output is $$nf(2-a) + nf\left(a-1-\frac{v}{c}\right)$$

which equals $$nf\left(1-\frac{v}{c}\right)$$

and is amplified by power amplifier 13 and transmitted from antenna 15. The signal travels from antenna 15 to receiving antenna 16 at station 1 and undergoes a Doppler shift. The signal arriving at antenna 16 is $$nf\left(1-\frac{v}{c}\right)\left(1+\frac{v}{c}\right)$$

which equals $$nf\left(1-\frac{v^2}{c^2}\right)$$

differing only by a second-order factor of $$nf\frac{v^2}{c^2}$$

from the signal generated at station 1 by frequency generator 3 after multiplication by factor $n$ in multiplier network 17. The frequencies of the two signals can be compared in beat frequency detector 18. The second-order difference $$nf\frac{v^2}{c^2}$$

is very small as long as the relative velocity of the two stations to each other is much smaller than the velocity of light. The above is also true for the case where station 1 and station 2 are moving away from each other. The factors $a$ and $n$ can be chosen to have convenient values from the viewpoint of easy construction of the necessary multiplier, divider, and amplifier networks. An example is given to illustrate this feature: $f$ is given at 240 mc. with $n$ and $a$ chosen to be $7/8$ and $14/13$, respectively. This yields a frequency of 18.46 mc. at the output of mixer 8 which can be amplified by IF amplifier 10 and multiplied in multiplier-divider network 11 by $7/8$. The amplifier, divider and multiplier networks are conventional. Frequency synthesizer 9 has to provide $af$ or $$\frac{14}{13}f$$

which equals 258.46 mc. and $nf(2-a)$ or $$\frac{21}{26}f$$

which equals 193.85 mc. These frequencies can be produced easily, for instance, by multiplication of a subharmonic of $f$ like $\frac{1}{26}f$ or 9.24 mc. which can be generated by a stable oscillator.

What is claimed is:

1. A system for cancelling Doppler shifts between a first station and a second station moving with respect to each other comprising: means for generating a first frequency located at the first station; means at the first station for synthesizing a multiple of the first frequency; means at the first station for transmitting the first frequency; means for receiving the first frequency at the second station; means for generating a second frequency located at the second station, the second frequency being the same as the first frequency and modulated with a signal; means at the second station for synthesizing a multiple of the second frequency; means at the second station for mixing the multiple of the second frequency with the first frequency, the first frequency being received at the second station; means at the second station for transmitting the output of the mixing means; means for receiving at the first station the output of the mixing means; and means for comparing the received signal at the first station with the multiple of the first frequency for detecting the signal transmitted from the second station.

2. A system for cancelling Doppler shifts between a first station and a second station moving with respect to each other comprising: means for generating a first frequency located at the first station; means for generating a second frequency located at the second station, the second frequency being the same as the first frequency and being modulated with a signal; means at the first station for synthesizing a third frequency which consists of a multiple of the first frequency; means at the first station for transmitting the first frequency; means for receiving the first frequency at the second station; means at the second station for synthesizing a fourth frequency and a fifth frequency, each consisting of multiples of the second frequency; a first mixer at the second station having for inputs the fourth frequency and the first frequency received at the second station; means at the second station for synthesizing a sixth frequency consisting of a multiple of the output of the first mixer; a second mixer at the second station having for inputs the fifth frequency and the sixth frequency; means at the second station for transmitting the output of the second mixer; means for receiving at the first station the output of the second mixer; and means for detecting the signal at the first station by comparing the third frequency with the received signal from the second station.

3. A system for cancelling Dopper shifts between a first station and a second station moving with respect to each other wherein the first station receives a signal transmitted by the second station differing only by a negligible second-order value from a signal generated at the first station, the system comprising: means for generating a first frequency located at the first station; means for generating a second frequency located at the second station, the second frequency being the same as the first frequency and being modulated with a signal; means at the first station for synthesizing a third frequency which consists of a multiple of the first frequency; means at the first station for transmitting the first frequency; means for receiving the first frequency at the second station; means at the second station for synthesizing a fourth frequency and a fifth frequency, each consisting of multiples of the second frequency; a first mixer at the second station having for inputs the fourth frequency and the first frequency received at the second station; means at the second station for synthesizing a sixth frequency consisting of a multiple of the output of the first mixer; a second mixer at the second station having for inputs the fifth frequency and the sixth frequency; means at the second station for transmitting the output of the second mixer; means for receiving at the first station the output of the second mixer; and a beat frequency detector at the first station for comparing the third frequency with the received signal from the second station.

References Cited

UNITED STATES PATENTS 2,974,222    3/1961    Lawson      325—17
3,263,173    7/1966    Collins et al.    325—17 X

OTHER REFERENCES

Badessa et al., Proc. I.R.E., vol. 48, No. 4, April 1960. pp. 758–764, TK 5700.17, 343–100 SAT.

JOHN W. CALDWELL, *Acting Primary Examiner.*